US012725135B2

(12) United States Patent
Kurani et al.

(10) Patent No.: US 12,725,135 B2
(45) Date of Patent: Sep. 1, 2026

(54) SYSTEMS AND METHOD FOR EXPEDITING MATH-BASED CURRENCY TRANSACTIONS

(71) Applicant: Wells Fargo Bank, N.A., San Francisco, CA (US)

(72) Inventors: Ashish Kurani, Hillsborough, CA (US); Wayne Barakat, Novato, CA (US); Martin Barrs, San Francisco, CA (US); Dominik Vltavsky, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 122 days.

(21) Appl. No.: 18/373,167

(22) Filed: Sep. 26, 2023

(65) Prior Publication Data

US 2024/0013204 A1 Jan. 11, 2024

Related U.S. Application Data

(63) Continuation of application No. 17/145,080, filed on Jan. 8, 2021, now Pat. No. 11,783,322, which is a (Continued)

(51) Int. Cl.

*G06F 16/23* (2019.01)
*G06Q 20/06* (2012.01)

(Continued)

(52) U.S. Cl.

CPC ..... *G06Q 20/0655* (2013.01); *G06F 16/2379* (2019.01); *G06Q 20/065* (2013.01);

(Continued)

(58) Field of Classification Search

CPC ............ G06Q 20/0655; G06Q 20/065; G06Q 20/0652; G06Q 20/204; G06Q 20/3678;

(Continued)

(56) References Cited

U.S. PATENT DOCUMENTS 6,047,067 A 4/2000 Rosen
2007/0265928 A1 11/2007 Fuchs et al.

(Continued)

FOREIGN PATENT DOCUMENTS

WO WO-2015/085393 A1 6/2015

OTHER PUBLICATIONS

U.S. Appl. No. 14/282,189, filed May 20, 2014, Wells Fargo Bank, N.A.

(Continued)

*Primary Examiner* — Patrick Mcatee
*Assistant Examiner* — Zesheng Xiao
(74) *Attorney, Agent, or Firm* — Foley & Lardner LLP

(57) ABSTRACT

Systems and methods for expediting math-based currency ("MBC") transactions. One method includes receiving a request for a pending MBC transaction, the request include an MBC address of a first party, an MBC address of a second party, and an amount of MBC to be transferred and determining a balance of MBC associated with the MBC address of the first party based on accessing a listing of address balances. Further the method includes in response to determining a threshold likelihood of success of confirming the pending MBC transaction, generating and formatting a guarantee identifier and embedding a copy of the guarantee identifier in a field of the pending MBC transaction. Further the method includes transmitting the guarantee identifier and transferring the amount of MBC from the MBC address of the first party to the MBC address of the second party based on verifying the pending MBC transaction.

20 Claims, 6 Drawing Sheets

Related U.S. Application Data continuation of application No. 14/752,096, filed on Jun. 26, 2015, now Pat. No. 10,909,510.

(51) Int. Cl.

| | |
|---|---|
| ***G06Q 20/10*** | (2012.01) |
| ***G06Q 20/20*** | (2012.01) |
| ***G06Q 20/36*** | (2012.01) |
| ***G06Q 20/38*** | (2012.01) |
| ***G06Q 20/40*** | (2012.01) |
| ***G06Q 40/02*** | (2023.01) |
| ***G06Q 40/03*** | (2023.01) |
| ***G06Q 40/04*** | (2012.01) |

(52) U.S. Cl.

CPC ....... *G06Q 20/0652* (2013.01); *G06Q 20/204* (2013.01); *G06Q 20/3678* (2013.01); *G06Q 20/389* (2013.01); *G06Q 20/4037* (2013.01); *G06Q 20/405* (2013.01); *G06Q 40/03* (2023.01); *G06Q 40/04* (2013.01); *G06Q 20/10* (2013.01); *G06Q 20/202* (2013.01); *G06Q 40/02* (2013.01); *G06Q 2220/00* (2013.01)

(58) Field of Classification Search

CPC ............. G06Q 20/389; G06Q 20/4037; G06Q 20/405; G06Q 20/10; G06Q 20/202; G06Q 20/24; G06Q 20/3276; G06Q 20/4014; G06Q 2220/00; G06Q 40/03; G06Q 40/04; G06Q 40/02; G06F 16/2379

See application file for complete search history.

(56) References Cited

U.S. PATENT DOCUMENTS

| | | | | |
|---|---|---|---|---|
| 2014/0181520 | A1 | 6/2014 | Wendling et al. | |
| 2014/0279425 | A1 | 9/2014 | Holman et al. | |
| 2015/0120551 | A1* | 4/2015 | Jung | G06Q 20/389 705/44 |
| 2015/0170112 | A1 | 6/2015 | Decastro | |
| 2015/0193768 | A1* | 7/2015 | Douglas | G06Q 20/4016 705/44 |
| 2015/0302400 | A1 | 10/2015 | Metral | |
| 2015/0332256 | A1 | 11/2015 | Minor | |
| 2015/0363770 | A1* | 12/2015 | Ronca | G06Q 20/382 705/64 |
| 2015/0363876 | A1 | 12/2015 | Ronca et al. | |
| 2016/0019546 | A1* | 1/2016 | Eisen | G06F 21/44 705/44 |
| 2016/0092859 | A1 | 3/2016 | Klingen | |
| 2016/0162897 | A1* | 6/2016 | Feeney | H04L 9/3236 705/71 |
| 2016/0210619 | A1 | 7/2016 | Shiota et al. | |
| 2017/0017958 | A1 | 1/2017 | Scott et al. | |

OTHER PUBLICATIONS

U.S. Appl. No. 14/282,202, filed May 20, 2014, Wells Fargo Bank, N.A.

14752096-REM_2019-12-04 (Year: 2019).

Antonopoulos, "Chapter 9. Alternative Chains, Currencies, and Applications," Mastering Bitcoin, retrieved from https://www.oreilly.com/library/view/mastering-bitcoin/9781491902639/ch09.htm1, 18 pages (2014).

Antonopoulos, "Chapter 9. Alternative Chains, Currencies, and Applications," Mastering Bitcoin, retrieved from https://www.oreilly.com/library/view/mastering-bitcoin/9781491902639/ch09.html, 18 pages (2014).

Antonopoulos, A. M. (2014); Mastering Bitcoin. Sebastopol, CA: O'Reilly Media. (Year: 2014).

Bitcoin Google to Show when Whitepaper for Nakamoto was published (Year: 2023).

Bitcoin: A Peer-to-Peer Electronic Cash System, Satoshi Nakamoto satoshin@gmx.com www.bitcoin.org (Year: 2023).

Blockchain technology: Applications and challenges. (2021 ). Intelligent Systems Reference Library. https://doi.org/10.1007/978-3-030-69395-4 (Year: 2021).

Fitzpatrick et al., "Banking on Stone Money: Ancient Antecedents to Bitcoin", Jun. 2019, American Anthropological Association, Economic Anthropology Jun. 2019, p. 1-4, 8-10 (Year: 2019).

Menezes, A. J., Oorschot, P. C., & Vanstone, S. A. (1997). Handbook of Applied Cryptography. Doi: 10.1201/9780429466335 (Year: 1997).

Pandya, D., Ram K. Thakkar, S., Madhekar. T., & Thakare, B. (2015). Brief History of Encryption, International Journal of Computer Applications, 131 (9), 28-31. Doi: 10.5120/ijca2015907390 (Year: 2015).

Yaga NIST.IR.8202 (Year: 2018).

* cited by examiner

SYSTEMS AND METHOD FOR EXPEDITING MATH-BASED CURRENCY TRANSACTIONS

CROSS-REFERENCE TO RELATED APPLICATIONS AND CLAIM OF PRIORITY

This application is a continuation of U.S. patent application Ser. No. 17/145,080, entitled "Systems and Methods for Expediting Math-Based Currency Transactions," filed Jan. 8, 2021, which is a continuation of and claims priority to U.S. patent application Ser. No. 14/752,096, entitled "Systems and Methods for Expediting Math-Based Currency Transactions," filed Jun. 26, 2015, which is related to U.S. patent application Ser. No. 14/752,074, entitled "Systems and Methods for Expediting Math-Based Currency Transactions," filed Jun. 26, 2015, all of which are incorporated herein by reference in their entireties and for all purposes.

TECHNICAL FIELD

Embodiments of the present invention relate generally to math-based currency transactions. In particular, the embodiments of the present invention relate to providing systems and methods to expedite certain transactions involving math-based currency.

BACKGROUND

Math-based currency ("MBC"), often referred to as cryptocurrency, is rising in popularity, use, and public acceptance. MBC differs from fiat currency (i.e., currency that is declared by a government to be a legal tender) in that principles of cryptography are used to create, secure, and transfer MBC directly from a first user to a second user instead of passing a fiat currency. A user of MBC can transfer funds to another party by using a private key associated with a certain value of MBC. The private key may be used to generate a signature for the transaction, and the signature can be verified by verification nodes in the MBC network, thereby completing the transaction. Additional information, including the identities of the parties involved in the exchange, is not required to effectuate the transaction. Accordingly, MBC allows for anonymous transfers of currency between users without the reliance on financial institutions (e.g., a bank) to facilitate the transfer. Examples of MBCs include Bitcoin, Ripple, Litecoin, Peercoin, and Dogecoin, among others.

As the popularity of MBC gains, more and more individuals are utilizing MBC in every-day transactions. For example, many retailers are beginning to accept MBC payments from individuals purchasing goods and services. One hurdle in transacting in MBC is the time delay between when a transaction is initiated and when the transaction is confirmed by the verification nodes. For example, a Bitcoin transaction may take more than ten minutes to be confirmed by the verification nodes. This delay presents issues in certain transactions involving MBC. For example, if a customer is at a brick-and-mortar location of a merchant and wishes to pay for goods with MBC, the merchant may force the customer to wait more than ten minutes until the pending MBC transfer is verified before allowing the customer to leave with the goods. Both the customer and the merchant would likely find the delays unacceptable. Accordingly, the customer may prefer to use a traditional form of payment, such as cash or credit card. Systems and methods that eliminate or reduce the delay of MBC transactions are desired.

SUMMARY

A first example embodiment relates to a method of providing a guarantee for a math-based currency transaction between a customer and a merchant. The method includes receiving, by a processor of a financial institution computing system via a network and from a customer device associated with the customer, a transaction request. The transaction request includes an identity of the customer, a recipient address associated with the merchant, and an amount of math-based currency to be transferred from the customer to the recipient address. The method further includes generating, by the processor, a guarantee identifier that is formatted such that it is insertable into a metadata field of the math-based currency transaction. The method includes storing, by the processor, the guarantee identifier in a reconciliation database. The method further includes embedding, by the processor, the guarantee identifier in the metadata field of the math-based currency transaction. The method includes broadcasting, by the processor and via the network, the math-based currency transaction to a plurality of math-based currency verification nodes.

Another example embodiment relates to a financial institution computing system associated with a financial institution. The system includes a network interface configured to communicate with a customer device associated with a customer and a merchant point of sale terminal associated with a merchant via a network. The system further includes an account database storing information relating to a plurality of financial accounts maintained by the financial institution. The system includes a memory and at least one processor. The at least one processor is configured to receive, via a network and from the customer device, a transaction request. The transaction request includes an identity of the customer, a recipient address associated with the merchant, and an amount of math-based currency to be transferred from the customer to the recipient address. The at least one processor is further configured to generate a guarantee identifier that is formatted such that it is insertable into a metadata field of the math-based currency transaction. The at least one processor is configured to store the guarantee identifier in a reconciliation database. The at least one processor is further configured to embed the guarantee identifier in the metadata field of the math-based currency transaction. The at least one processor is configured to broadcast the math-based currency transaction to a plurality of math-based currency verification nodes via the network.

A further example embodiment relates to a non-transitory computer-readable media having computer-executable instructions embodied therein that, when executed by a processor of a financial institution computing system, cause the financial institution computing system to perform a process of providing a guarantee for a math-based currency transaction between a customer and a merchant. The process includes receiving, from a customer device associated with the customer and via a network and from a customer device associated with the customer, a transaction request. The transaction request includes an identity of the customer, a recipient address associated with the merchant, and an amount of math-based currency to be transferred from the customer to the recipient address. The process further includes generating a guarantee identifier that is formatted such that it is insertable into a metadata field of the math-based currency transaction. The process includes storing the guarantee identifier in a reconciliation database. The process further includes embedding the guarantee identifier in the metadata field of the math-based currency transaction. The process includes broadcasting the math-based currency transaction to a plurality of math-based currency verification nodes via the network.

These and other features, together with the organization and manner of operation thereof, will become apparent from the following detailed description when taken in conjunction with the accompanying drawings.

DETAILED DESCRIPTION

Referring to the figures generally, systems and methods for expediting MBC transactions are described. A financial institution facilitates the expedited MBC transactions. The expedited MBC transactions are achieved either by providing merchants with a customer score for a customer that is paying for goods or services with MBC or by guaranteeing merchants that a pending MBC transaction will be verified by the MBC verification nodes. The customer score is based at least in part on prior MBC transactions entered into by the customer. In some arrangements, the customer score is also based on balance information and transaction information associated with accounts maintained with the financial institution. A provided guarantee can be collected on by the merchant in the event that a guaranteed MBC transaction is not verified by the MBC verification nodes.

Figure 1:
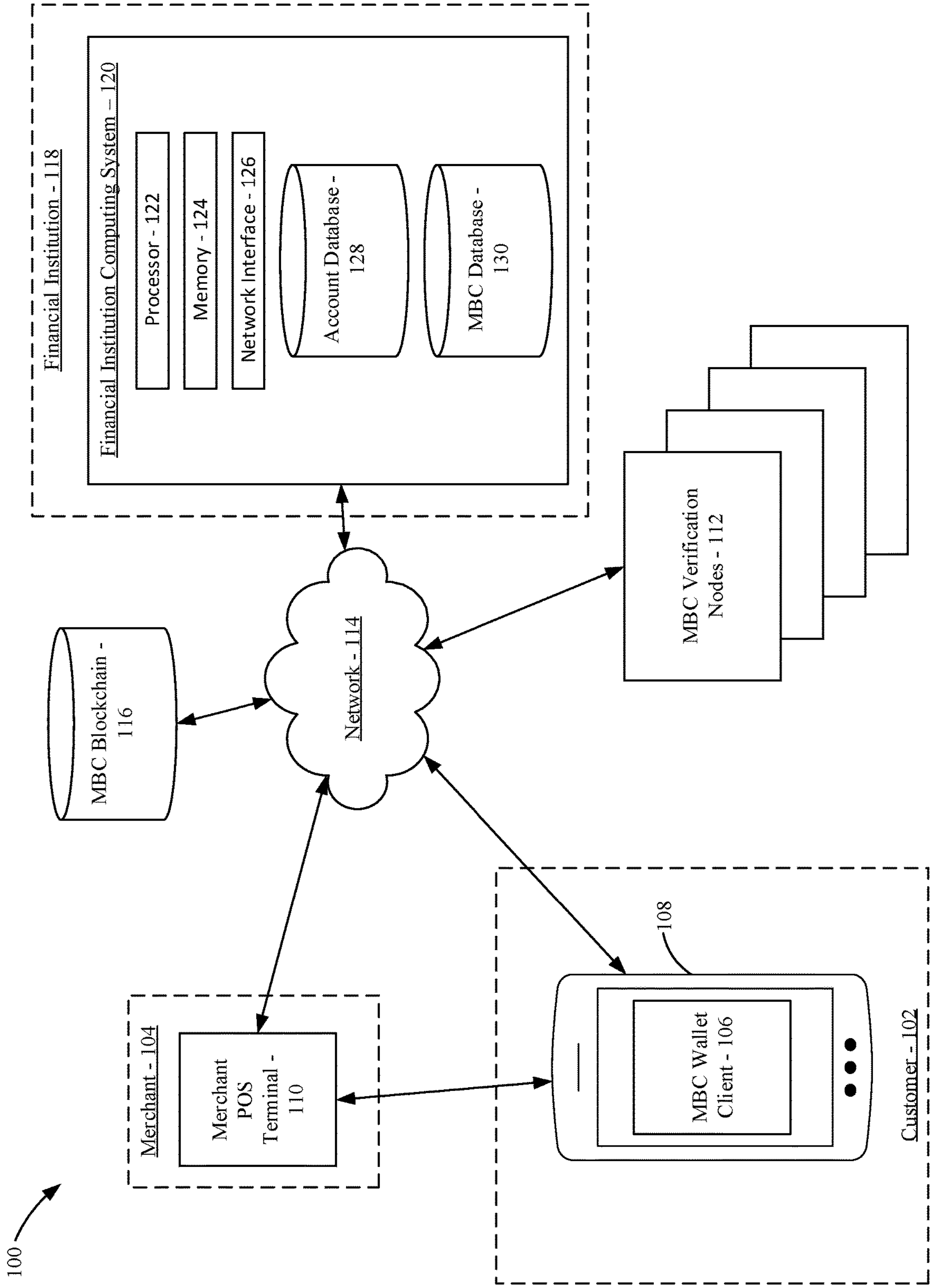
FIG. 1 is a diagram of a computing system according to an example embodiment.

Referring to FIG. 1, a diagram of a computing system 100 according to an example embodiment. As described in further detail below, the computing system 100 facilitates a transaction between a customer 102 and a merchant 104. The transaction is a purchase of a good or service by the customer 102 and from the merchant 104. The customer 102 pays the merchant 104 with MBC. For example, the customer 102 may pay the merchant 104 with Bitcoin, Litecoin, Ripple, or the like. The purchase may be an in person purchase (e.g., a transaction in which the customer 102 is physically present at a location of the merchant 104) or a customer-not-present purchase (e.g., a telephone order, an internet purchase, etc.).

To effect the payment for the purchase, the customer 102 utilizes a MBC wallet client 106 running on a customer device 108 to send an agreed upon amount of MBC from the customer 102 to the merchant 104. In practice, the customer 102 owns a certain amount of MBC associated with a customer address or a plurality of customer address. The MBC may be held in a MBC bank account, such as those described in U.S. patent application Ser. No. 14/282,189, entitled "SYSTEMS AND METHODS FOR MAINTAINING DEPOSITS OF MATH-BASED CURRENCY," by Kurani, and filed on May 20, 2014, and U.S. patent application Ser. No. 14/282,202, entitled "INFRASTRUCTURE FOR MAINTAINING MATH-BASED CURRENCY ACCOUNTS," by Kurani, and filed on May 20, 2014, both of which are hereby incorporated by reference in their entireties and for all purposes. To begin the transaction, the customer 102 selects his account via the MBC wallet client 106, selects an amount of MBC to send to the merchant 104, and inputs a MBC address associated with the merchant 104. The customer 102 can input the merchant's MBC address into the MBC wallet client 106 by manually typing the address in, by scanning a code (e.g., a QR code) displayed by the merchant (e.g., via a screen of a merchant POS terminal 110), by receiving the address from the merchant POS terminal 110 (e.g., via a wireless data transfer, such as Bluetooth, WiFi, or NFC), or the like.

Once the information concerning the transaction is input into the MBC wallet client 106, the transaction can be confirmed by the customer 102. After confirmation, the MBC wallet client 106 signs (e.g., encrypts) the transaction with a private encryption key held by the customer 102 and broadcasts the pending transaction to MBC verification nodes 112 via a network 114, such as the Internet. Alternatively, the transaction information is sent to the financial institution 118 for broadcasting to the MBC verification nodes 112. The MBC wallet client 106 also sends a confirmation to the Merchant POS terminal 110 that that the MBC transaction is pending. The MBC verification nodes 112 verify that the customer's address has enough MBC to complete the pending transaction and that the customer has authorized the pending transaction by cryptographically verifying the encrypted transaction. Once verified by the MBC verification nodes 112, the transaction is recorded in a MBC blockchain 116. The MBC blockchain 116 is a chronological and public ledger of all MBC transactions that have been executed. The entire transaction, from the time when the MBC wallet client 106 broadcasts the signed transaction to the MBC verification nodes 112, to the time when the MBC verification nodes 112 verify the transaction and record the transaction in the MBC blockchain 116, can take in excess of ten minutes.

The delay potentially impedes everyday transactions between the customer 102 and the merchant 104. For example, if the customer 102 is purchasing an item from the merchant 104, the customer 102 may need to wait over ten minutes after initiating the transaction until the customer 102 is permitted to leave the merchant 104 with the item. To address the delay, the customer 102 or the merchant 104 contacts a financial institution 118 to expedite the pending MBC transaction. In some arrangements, the financial institution 118 provides an assessment of the customer 102. The assessment is a customer score, such as a credit score, that indicates a trustworthiness of the customer 102 and/or a likelihood that the MBC transaction will ultimately be verified by the MBC verification nodes 112. The merchant 104 uses the provided assessment to determine whether to allow the customer 102 to leave with the goods or receive the service before the MBC transaction is verified based on merchant-specific thresholds of customer scores. In other arrangements, the financial institution 118 provides a transaction guarantee to the merchant 104 that the MBC transaction will ultimately be verified. In such arrangements, the merchant 104 may provide the financial institution 118 a fee (e.g., a percentage of the transaction, a flat fee, etc.) in exchange for the transaction guarantee. In the event that the MBC transaction fails and is not verified, the financial institution 118 would then provide the missing funds to the merchant 104.

The financial institution 118 includes a financial institution computing system 120. The financial institution computing system 120 includes a processor 122 and memory 124. The memory 124 stores programming modules that, when executed by the processor 122, control the operation of the financial institution computing system 120. The financial institution computing system 120 includes a network interface 126. The network interface 126 facilitates the sending and receiving of data over the network 114 (e.g., to and from the merchant POS system 110). The financial institution computing system 120 includes an account database 128 that stores customer information and account information relating to accounts held with the financial institution 118. The financial institution computing system 120 also includes a MBC database 130 that stores data relating to customer scores and/or MBC transaction guarantees. The provision of the MBC transaction guarantee and the provision of the MBC customer score via the financial institution computing system 120 are described in further detail below.

Figure 2:
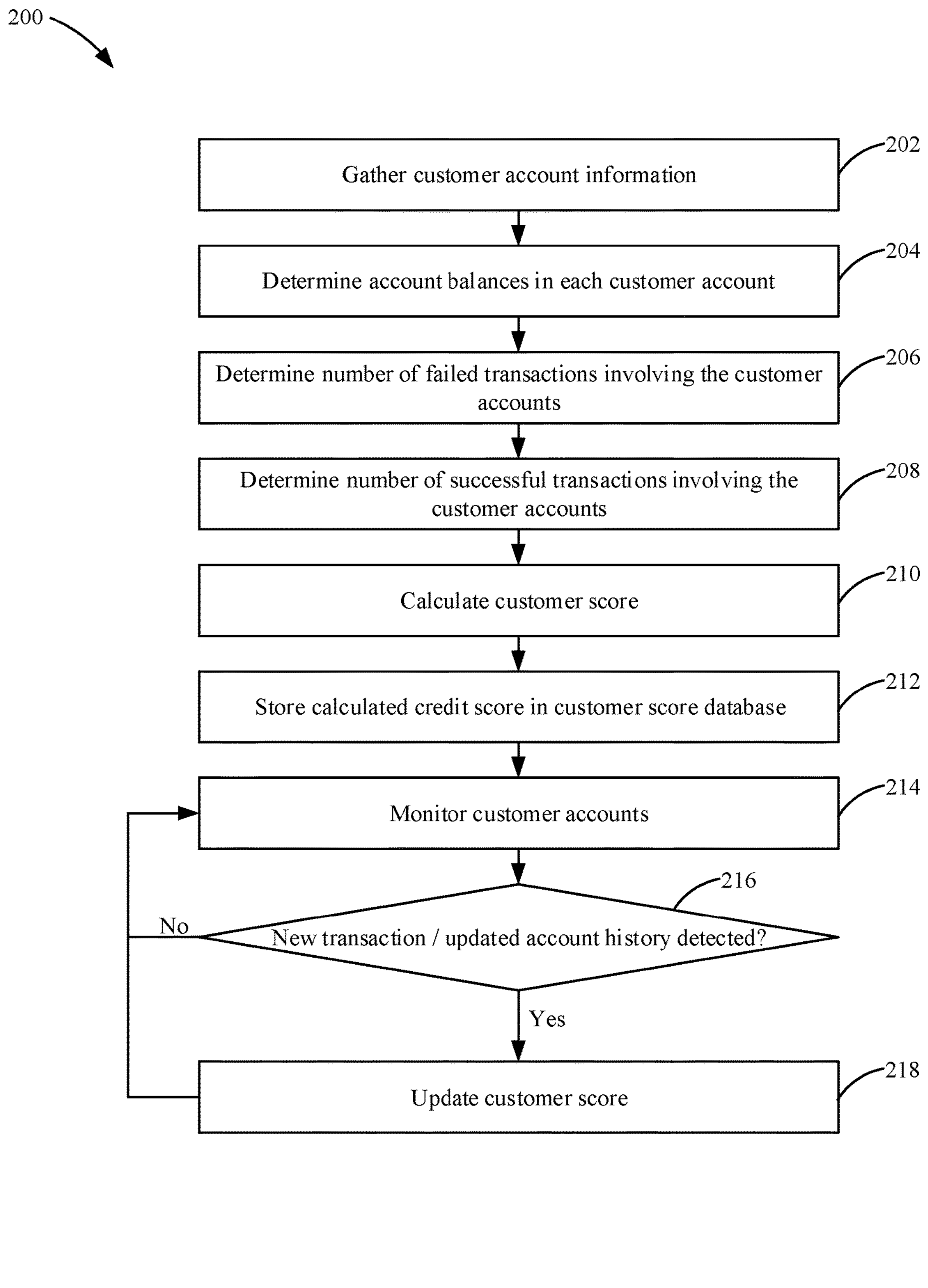
FIG. 2 is a flow diagram of a method of maintaining a customer score is shown according to an example embodiment.

With respect to FIG. 2, a flow diagram of a method 200 of maintaining a customer score (i.e., scoring a customer) is shown according to an example embodiment. Method 200 is performed by the financial institution computing system 120 (e.g., by the processor 122). The customer score generated in method 200 can be later transmitted to a merchant (e.g., merchant 104) during a MBC transaction between the merchant and a customer (e.g., customer 102). The customer is an account holder with the financial institution 118.

Method 200 begins when customer account information is gathered at 202. The financial institution 118 has access to information for all account holders (i.e., "customers") with the financial institution 118. Accordingly, the first step of method 200 is to gather information relating to customers of the financial institution 118. The financial institution computing system 120 accesses the account database 128 to pull the customer information. In some arrangements, only information relating to customers associated with MBC accounts held with the financial institution 118 is pulled. In such arrangements, the financial institution 118 may only provide the customer scores to merchants for customers that hold MBC accounts with the financial institution 118. In other arrangements, information relating to all customers of the financial institution 118 is pulled.

Account balances in each customer account are determined at 204. The financial institution computing system 120 pulls the account balances from the account database 128. The customer may have positive or negative balances. For example, if the customer has a checking account or a savings account with the financial institution 118, the balances of the checking and savings account may be positive. If the customer has a credit account, a home equity line of credit, a mortgage, etc., the account balances may be negative.

Transactions associated with the accounts are analyzed at 206 and 208. A number of failed transactions involving the customer accounts are determined at 206. A number of successful transactions involving the customer accounts are determined at 208. The financial institution computing system 120 determines a number of failed and successful transactions associated with each account of the customer being scored. A failed transaction may relate to a bounced check written by the customer, a transaction that causes an account to be overdrawn or fall below a minimum balance requirement, a late payment on a line of credit, and the like. A successful transaction is any transaction that the customer is a party to that was successfully funded.

A customer score is calculated at 210. The financial institution computing system 120 calculates the customer score for the customer based at least in part on the balances associated with the customer's accounts with the financial institution 118, the number of failed transactions across the customer's accounts, and the number of successful transactions across the customer's accounts. The score may be a number on a scale (e.g., a number on the scale of one to ten, in which ten represents the highest level of customer trustworthiness with respect to pending transactions), a letter on a grade scale (e.g., a letter on the scale of A to F, where A is the highest rating), or a percentage (e.g., a percentage or percentile indication rating the customer against his peers).

The calculated customer score is stored in a customer score database at 212. The financial institution computing system 120 stores the calculated customer store in the MBC database 130. The customer score may be associated with various customer identifiers, such as the customer's name, the customer's account number(s), MBC addresses associated with the customer, MBC wallet login information, customer e-mail addresses, and the like.

After calculating the initial customer score at 210, the customer accounts are monitored at 214. The financial institution computing system 120 monitors the customer accounts for new transactions (failed or successful), new account openings, account closings, new balances, and any other account information that may change the customer's score. If new action concerning the customer's account is identified at 216, the customer score is updated at 218. The financial institution computing system 120 updates the customer's score in the same manner as described above with respect to 210. The updated customer score is stored in the MBC database 130 as described with respect to 212. If no new action is detected at 216 or after the customer score is updated at 218, method 200 returns to 214.

Method 200 is repeated for each customer that is tracked with a customer score. As described in further detail below with respect to method 300, the customer's score may be used by a merchant (e.g., merchant 104) in deciding whether to allow the customer to receive the goods or services before the pending MBC transaction is confirmed or to make the customer wait for the goods or services until the pending MBC transaction is confirmed by the MBC verification nodes 112.

Figure 3:
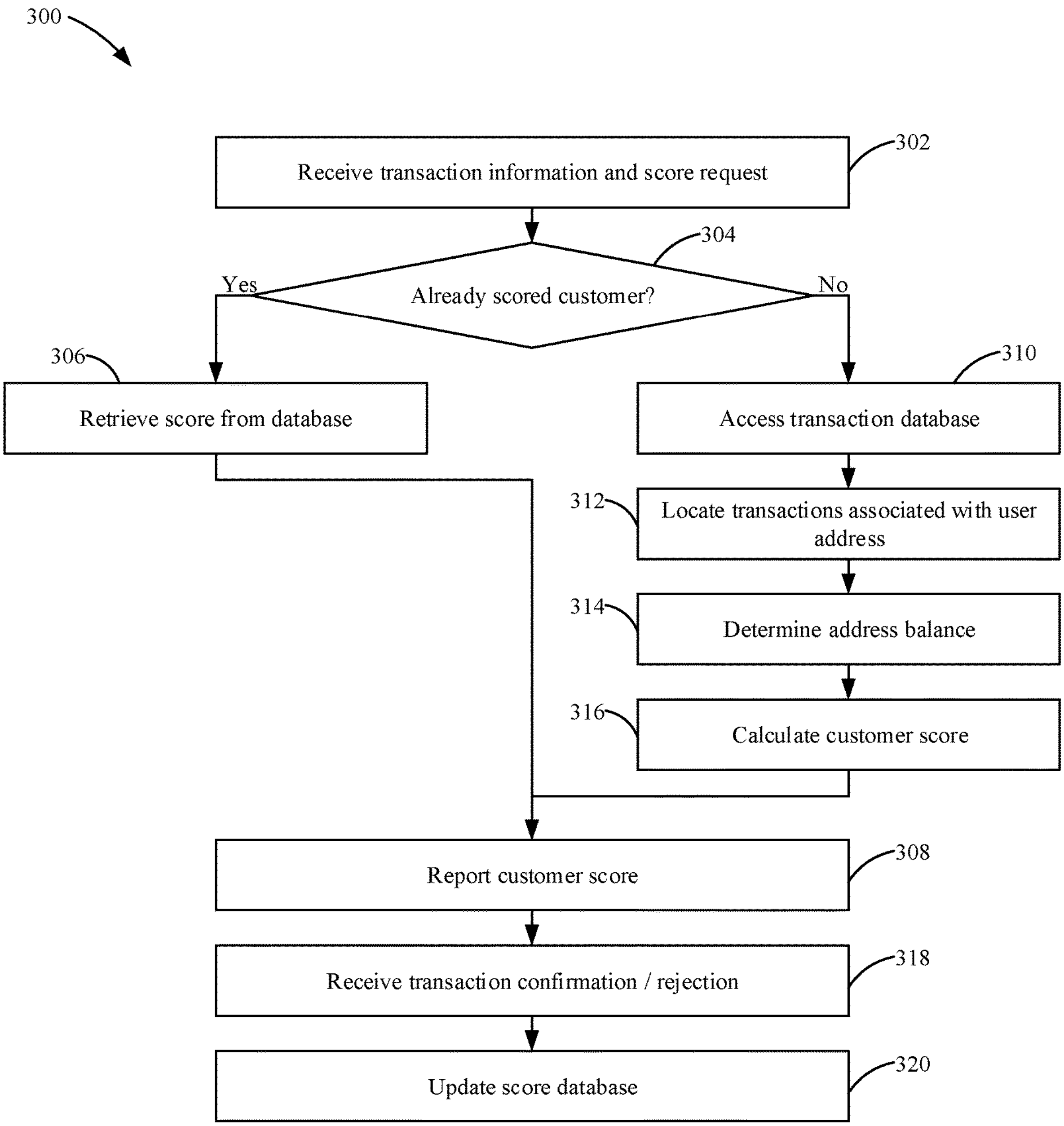
FIG. 3 is a flow diagram of a method of providing a customer score to a merchant during a transaction between the merchant and the customer is shown according to an example embodiment.

Referring to FIG. 3, a flow diagram of a method 300 of providing a customer score to a merchant during a transaction between the merchant and the customer is shown according to an example embodiment. Method 300 is performed by the financial institution computing system 120 (e.g., by the processor 122). The customer score generated in method 200 can be later transmitted to a merchant (e.g., merchant 104) during a MBC transaction between the merchant and a customer (e.g., customer 102). The customer score provided by the financial institution 118 to the merchant 104 may, for example, be determined by method 200 or by another method.

Method 300 begins when transaction information and a score request are received at 302. The transaction information and the score request are received by the financial institution computing system 120 and from the merchant. In some arrangements, the transaction information and score request are received from the merchant POS terminal 110. The transaction information includes an amount of a pending MBC transfer from the customer to the merchant, a MBC address associated with the customer, and a time of the transaction. In arrangements where the transaction information is received from the merchant POS terminal 110, the transaction information also includes a merchant identification number ("MID") and terminal identification number ("TID") that is used to route communication directly to the specific merchant POS terminal 110 at the specific location of the merchant. In some arrangements, the transaction information also includes a customer identifier (e.g., a username associated with the MBC wallet client 106). The score request includes a request from the merchant to provide a customer score relating to the customer. The score request and transaction information may be bundled into a single message or received as separate messages.

Based upon the received transaction information, the financial institution computing system 120 determines if the customer associated with the transaction information is an already scored customer at 304. As discussed above with respect to method 200, in some arrangements, the financial institution computing system 120 maintains customer scores for various customers of the financial institution 118.

If a customer score for the customer identified is already maintained by the financial institution 118, the customer score is retrieved from a database at 306. The financial institution computing system 120 retrieves the customer score from the MBC database 130. The retrieved customer score is then reported at 308. The financial institution computing system 120 reports the score by transmitting the customer score to the merchant (e.g., to the merchant POS terminal 110). In some arrangements, the customer score is formatted to merchant specific format. For example, the financial institution 118 may store the customer scores as percentiles, but the merchant may require that the customer score be presented in terms of a raw number. Accordingly, in such circumstances, the customer score is first formatted by the financial institution computing system 120 to a merchant-specific format prior to reporting the score at 308. The reported customer score is used by the merchant to determine whether to permit the customer to leave with goods or receive services before the pending MBC transaction is validated by the MBC verification nodes 112. In arrangements where the customer score is transmitted to the merchant POS terminal 110, the message containing the customer score is routed via the received MID and TID associated with the merchant POS terminal 110.

If a customer score for the customer identified is not already maintained by the financial institution 118, the customer score may be calculated in approximately real time by the financial institution computing system 120. For example, the customer score may not be maintained by the financial institution 118 when the customer is not a customer (i.e., account holder) with the financial institution 118. Accordingly a transaction database is accessed at 310. The transaction database may, for example, be the MBC blockchain 116. As discussed above, the MBC blockchain is a chronological and public ledger of all MBC transactions that have been executed. As such, the MBC blockchain 116 includes a history associated with each MBC address associated with any user of the MBC system. Based on the information in the MBC blockchain 116, the financial institution computing system 120 can calculate a customer score for any customer associated with an address in the MBC blockchain 116. To calculate the score, transactions associated with the provided customer address are located at 312. The financial institution computing system 120 scans the MBC blockchain 116 for that address provided by the merchant to the financial institution 118 at 302. The financial institution computing system 120 identifies all transactions, both failed and successful. The current balance of MBC associated with the address is determined at 314. The financial institution computing system 120 determines the balance of MBC associated with the address based either on a listing of address balances maintained in the MBC blockchain 116 or based on the transaction information located at 312.

Based at least in part on the transaction information located at 312 and at least in part on the address balance determined at 314, a customer score is calculated at 316. The financial institution computing system 120 calculates the customer score. In some arrangements, the customer score is calculated in a similar manner as described above with respect to method 200. In other arrangements, the score calculated at 316 has a lower "high score" than the score calculated in method 200 due to a lack of information sources being available relating to the customer.

The customer score calculated at 316 is reported at 308. The financial institution computing system 120 reports the score by transmitting the customer score to the merchant (e.g., to the merchant POS terminal 110). As discussed above, the customer score may be formatted to a merchant-specific prior to reporting the score at 308. In arrangements where the customer score is transmitted to the merchant POS terminal 110, the message containing the customer score is routed via the received MID and TID associated with the merchant POS terminal 110. In some arrangements, the reported customer score for based solely on the information contained in the MBC blockchain 116 includes a disclaimer indicating that the score is based solely on information contained in the MBC blockchain 116 and not on additional information, such as account balances held with the financial institution 118.

The merchant may use the reported customer score to determine whether to permit the customer to leave with goods or receive services before the MBC verification nodes 112 validate the pending MBC transaction. Unlike a guarantee issued by the financial institution 118 (e.g., as discussed below with respect to FIGS. 3-6), the merchant cannot collect from the financial institution 118 when a pending MBC transaction fails. Rather, the merchant can set internal customer score thresholds and independently decide whether to allow the customer to leave with the goods or services or to make the customer wait until the pending MBC transaction is verified by the MBC verification nodes 112. Further, different merchants can have different thresholds. For example, if a customer is scored on a percentile scale and has a customer score of 85%, a first merchant may allow any customer whose score is 80% or higher to leave, while a second merchant may allow any customer whose score is 90% or higher to leave. Accordingly, the customer would be permitted to leave the first merchant before the pending MBC transaction is verified, but the customer would have to wait for the MBC transaction to be verified before leaving the second merchant.

Still referring to FIG. 3, in some arrangements, method 300 ends after the customer score is reported at 308. In other arrangements, a transaction confirmation or rejection is received at 318. The financial institution computing system 120 receives the transaction confirmation or rejection from the merchant (e.g., from the merchant POS terminal 110). Depending on whether the pending MBC transaction was confirmed (i.e., verified by the MBC verification nodes 112) or rejected (i.e., rejected by the MBC verification nodes 112), the financial institution 118 can utilize the transaction result to update the customer's score (e.g., increase the customer's score if the transaction was successful or decrease the customer's score if the transaction was rejected). The score database is updated at 320. The financial institution computing system 120 updates the customer's score in the MBC database 130.

The financial institution 118 can also expedite pending MBC transactions between the customer 102 and the merchant 104 by offering payment guarantees. The payment guarantees allow the merchant 104 to provide the goods or services purchased by the customer 102 to the customer 102 without waiting for the MBC verification nodes 112 to verify the pending MBC transaction. The guarantee may arise automatically for payments originating from customers of the financial institution 118 (e.g., as discussed in further detail with respect to method 400) or based upon a request from the merchant 104 (e.g., as discussed in further detail with respect to method 500). If the financial institution 118 issues a guarantee for a pending MBC transaction and the pending transaction fails, the merchant 104 can collect on the guarantee from the financial institution 118 as discussed in further detail with respect to method 600.

Figure 4:
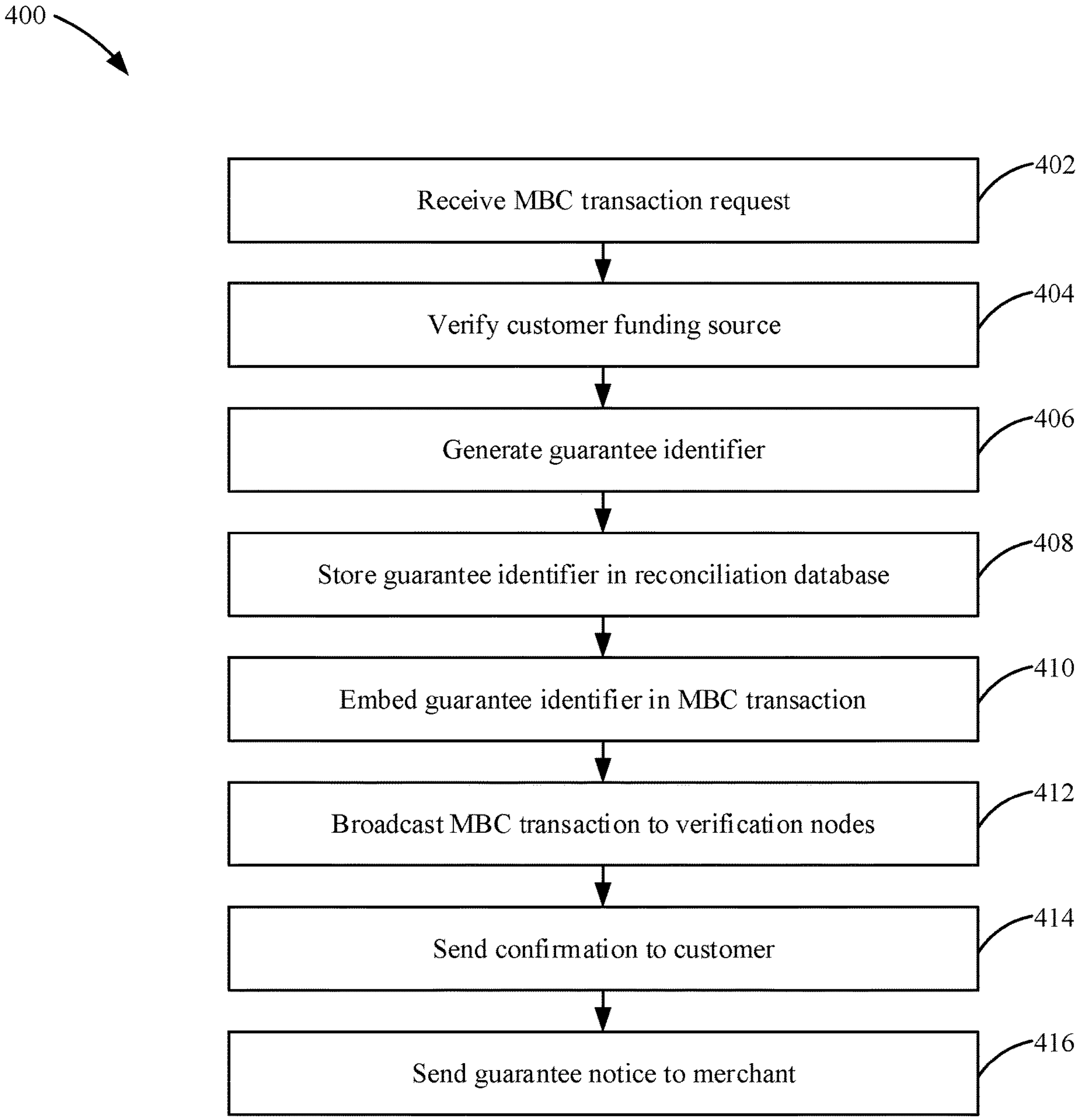
FIG. 4 is a flow diagram of a method of providing a guarantee for a MBC transaction based on customer provided information is shown according to an example embodiment.

Referring to FIG. 4, a flow diagram of a method 400 of providing a guarantee for a MBC transaction based on customer provided information is shown according to an example embodiment. Method 400 is performed by the financial institution computing system 120 (e.g., by the processor 122). The financial institution 118 provides the guarantee, which guarantees payment to a merchant (e.g., merchant 104) should a pending MBC transaction between a customer (e.g., customer 102) and the merchant fail. As described below, the guarantee is automatically generated when the customer initiates payment to the merchant via the MBC wallet client 106 running on the customer device 108. Accordingly, the customer is also a customer of the financial institution 118.

Method 400 begins when a MBC transaction request is received at 402. The financial institution computing system 120 receives the MBC transaction request from the customer via a customer device (e.g., via customer device 108). In some arrangements, the transaction request is generated by the MBC wallet client 106 running on the customer device 108. The transaction request includes an identity of the customer (i.e., the MBC sending party), a recipient address (i.e., an address associated with the merchant), and an amount of MBC to be transferred from the customer to the merchant. The identity of the customer may include a customer user name and/or an address associated with MBC held by the customer. In some arrangements, the transaction request includes a MID and TID of the merchant POS terminal 110 where the customer is making the purchase.

A customer funding source is verified at 404. The financial institution computing system 120 locates customer account information in the account database 128 to verify that the customer both has a MBC account with the financial institution 118 and that the MBC account has a positive balance in excess of the amount of MBC to be transferred from the customer to the merchant. In some arrangements, the customer funding source may be a MBC credit account. In such arrangements, the funding source is verified if the amount of available credit is equal to or exceeds the amount of MBC to be transferred from the customer to the merchant. If a customer funding source is not verified at 404, the transaction is not approved (i.e., not broadcast to the MBC verification nodes 112) and a guarantee is not issued. However, the description of method 400 proceeds with the assumption that a customer funding source is verified at 404.

After the customer funding source is verified, a guarantee identifier is generated at 406. The financial institution computing system 120 generates the guarantee identifier. The guarantee identifier is formatted such that it can be included as metadata within the MBC transaction. For example, the guarantee identifier may selected such that it is insertable into the op_return field or another metadata field of a MBC transaction and such that it identifies an entry in a database including details about the guarantee. The financial institution computing system 120 stores the guarantee identifier in a reconciliation database at 408. In some arrangements, the reconciliation database is part of the MBC database 130. The reconciliation database includes a listing of each issued guarantee identifier. Each listing matches each guarantee identifier with transaction details specific to the corresponding MBC transaction. The transaction details include a customer identifier, sending MBC address, a receiving MBC address, an amount of the MBC being transferred from the sender to the receiver, and a date of the transaction. The reconciliation database is used by the financial institution 118 in situations in which the merchant attempts to collect on a guarantee issued by the financial institution 118 (e.g., as described below with respect to FIG. 6).

Method 400 continues when the guarantee identifier is embedded in a MBC transaction at 412. The financial institution computing system 120 creates a MBC transaction transferring the agreed upon amount of MBC from an address associated with the customer to an address associated with the merchant. The guarantee identifier is inserted into the op_return (e.g., of a Bitcoin transaction) or another data field of the MBC transaction that can store metadata associated with the transaction. After creating a MBC transaction and embedding the guarantee identifier in the MBC transaction, the MBC transaction is broadcast to the MBC verification nodes 112 at 412. The financial institution computing system 120 broadcasts the MBC transaction to the MBC verification nodes 112 via the network 114. In an alternative arrangement, the financial institution computing system 120 transmits the MBC transaction having the embedded guarantee identifier to the MBC wallet client 106 on the customer device 108 for broadcasting to the MBC verification nodes 112.

After the MBC transaction is broadcasted to the MBC verification nodes at 412, the customer and the merchant are notified of the guaranteed pending MBC transfer. Specifically, a confirmation is sent to the customer at 414. The financial institution computing system 120 sends the confirmation of the guaranteed transaction to the customer. In some arrangements the confirmation is an alert presented via the MBC wallet client 106 on the customer device 108. In other arrangements, the confirmation is sent as an e-mail alert, a text message alert, or the like. A confirmation of the guaranteed transaction is sent to the merchant at 416. The financial institution computing system 120 sends the confirmation of the guaranteed transaction to the merchant. In some arrangements the confirmation is sent from the financial institution computing system 120 to the merchant POS terminal 110. In arrangements where the confirmation is transmitted to the merchant POS terminal 110, the message containing the confirmation is routed via the received MID and TID associated with the merchant POS terminal 110. In other arrangements, the confirmation is sent as an e-mail alert, a text message alert, or the like. In further arrangements, the merchant is not notified of the guarantee other than being able to view the guarantee in the metadata of the pending MBC transaction.

Figure 5:
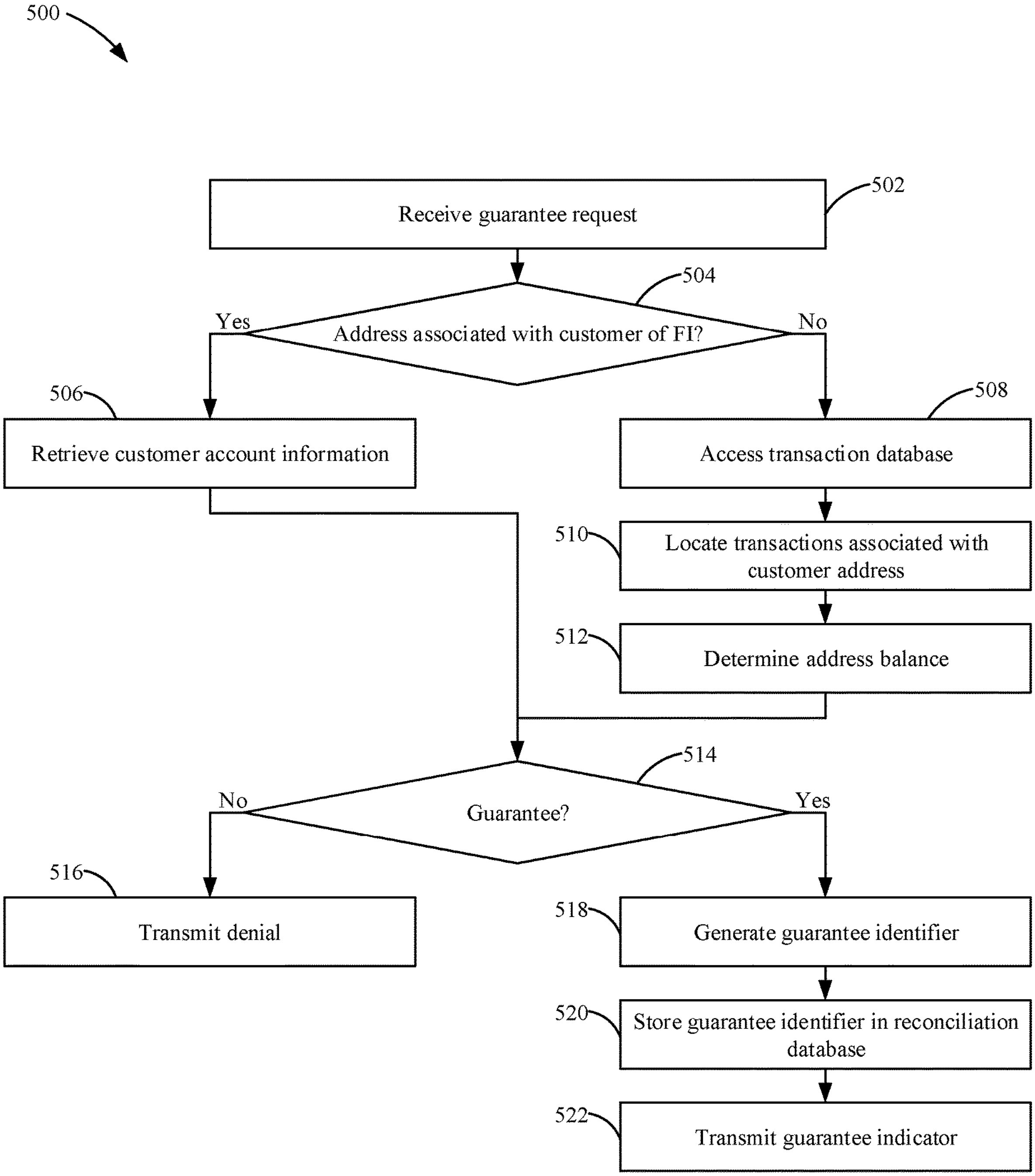
FIG. 5 is a flow diagram of a method of providing a guarantee for a MBC transaction based on a merchant request is shown according to an example embodiment.

Referring to FIG. 5, a flow diagram of a method 500 of providing a guarantee for a MBC transaction based on a merchant request is shown according to an example embodiment. Method 500 is performed by the financial institution computing system 120 (e.g., by the processor 122). The financial institution 118 provides the guarantee, which guarantees payment to a merchant (e.g., merchant 104) should a pending MBC transaction between a customer (e.g., customer 102) and the merchant fail. As described below, the guarantee is generated in response to a request from the merchant to guarantee a pending MBC payment. The guarantee may be provided for payments originating from customers of the financial institution 118 (e.g., customers that hold accounts with the financial institution 118) and non-customers of the financial institution 118.

Method 500 begins when a guarantee request is received at 502. The financial institution computing system 120 receives the guarantee request from the merchant. The guarantee request includes transaction information concerning a pending MBC transfer from the customer to the merchant that the merchant would like the financial institution to guarantee. The transaction information includes a MBC address associated with the customer, a MBC address associated with the merchant, and an amount of MBC being transferred. In some arrangements, the transaction information also includes a customer identifier other than the MBC address associated with the customer (e.g., an e-mail address, a customer name, customer login information for the MBC wallet client 106, etc.). The guarantee request may be transmitted from the merchant POS terminal 110. As such, the guarantee request may include a TID and MID relating to the specific POS terminal 110 at the merchant.

Based on the received transaction information, the financial institution computing system 120 determines if the MBC address associated with the customer is associated with a customer of the financial institution 118 at 504. To determine whether the address is associated with a customer of the financial institution 118, the financial institution computing system 120 compares the address with known addresses of customers (e.g., as stored in the account database 128 or the MBC database 130).

If the address is associated with a customer of the financial institution 118, customer account information is retrieved at 506. The financial institution computing system 120 retrieves the customer account information from the account database 128. The customer account information includes account balance information, transaction histories associated with the customer, and any customer score information (e.g., customer score as calculated in method 200). The customer account information is used in determining whether a guarantee can be issued for the pending MBC transaction.

If the address is not associated with a customer of the financial institution 118, a transaction database is accessed at 508. The transaction database may, for example, be the MBC blockchain 116. As discussed above, the MBC blockchain is a chronological and public ledger of all MBC transactions that have been executed. As such, the MBC blockchain 116 includes a history associated with each MBC address associated with any user of the MBC system. Based on the information in the MBC blockchain 116, the financial institution computing system 120 can identify all transactions associated with the MBC address associated with the customer. Accordingly, transactions involving the customer address are located at 510. The financial institution computing system 120 scans the MBC blockchain 116 for the address associated with the customer provided by the merchant to the financial institution 118 at 502. Transactions, both failed and successful, are identified by the financial institution computing system 120. In some arrangements, all transactions involving the address are located. In other arrangements, the search of the MBC blockchain 116 is a time limited search. For example, the financial institution computing system 120 may limit the search to all transactions involving the address in a predetermined period of time (e.g., the past year, the past two years, etc.). The current balance of MBC associated with the address is determined at 512. The financial institution computing system 120 determines the balance of MBC associated with the address based either on a listing of address balances maintained in the MBC blockchain 116 or based on the transaction information located at 510.

Based on the customer account information (retrieved at 506) or the information retrieved from the transaction database (transaction information received at 510, address balance determined at 512), the financial institution computing system 120 determines whether to issue a guarantee for the pending MBC transaction at 514. The financial institution 118 issues the guarantee if there is a threshold likelihood of success that the MBC verification nodes 112 will confirm the MBC transaction. This threshold level may vary based on the amount of MBC being transferred from the customer to the merchant and a level of risk associated with the customer. If the financial institution 118 decides not to issue a guarantee at 514, a denial is transmitted at 516. The financial institution computing system 120 transmits the denial to the merchant (e.g., to the merchant POS terminal 110). In arrangements where the denial is transmitted to the merchant POS terminal 110, the message containing the denial is routed via the MID and TID associated with the merchant POS terminal 110.

If the financial institution 118 decides to issue a guarantee at 514, a guarantee identifier is generated at 518. The financial institution computing system 120 generates the guarantee identifier. In some arrangements, the guarantee identifier is formatted such that it can be included as metadata within the MBC transaction (e.g., as discussed above with respect to method 400). The guarantee identifier is stored in a reconciliation database at 520. The financial institution computing system 120 stores the guarantee identifier in a reconciliation database. In some arrangements, the reconciliation database is part of the MBC database 130. The reconciliation database includes a listing that matches each guarantee identifier with transaction details. The transaction details include a customer identifier, sending MBC address, a receiving MBC address, an amount of the MBC being transferred from the sender to the receiver, and a date of the transaction. The reconciliation database is used by the financial institution 118 in situations in which the merchant attempts to collect on a guarantee issued by the financial institution 118. A guarantee indication is transmitted at 522. The financial institution computing system 120 transmits the guarantee to the merchant (e.g., via the merchant POS terminal 110). In arrangements where the guarantee is transmitted to the merchant POS terminal 110, the message containing the guarantee is routed via the MID and TID associated with the merchant POS terminal 110. The guarantee indication includes the guarantee identifier such that the merchant can later attempt to collect on the guarantee should the pending MBC transaction fail.

Figure 6:
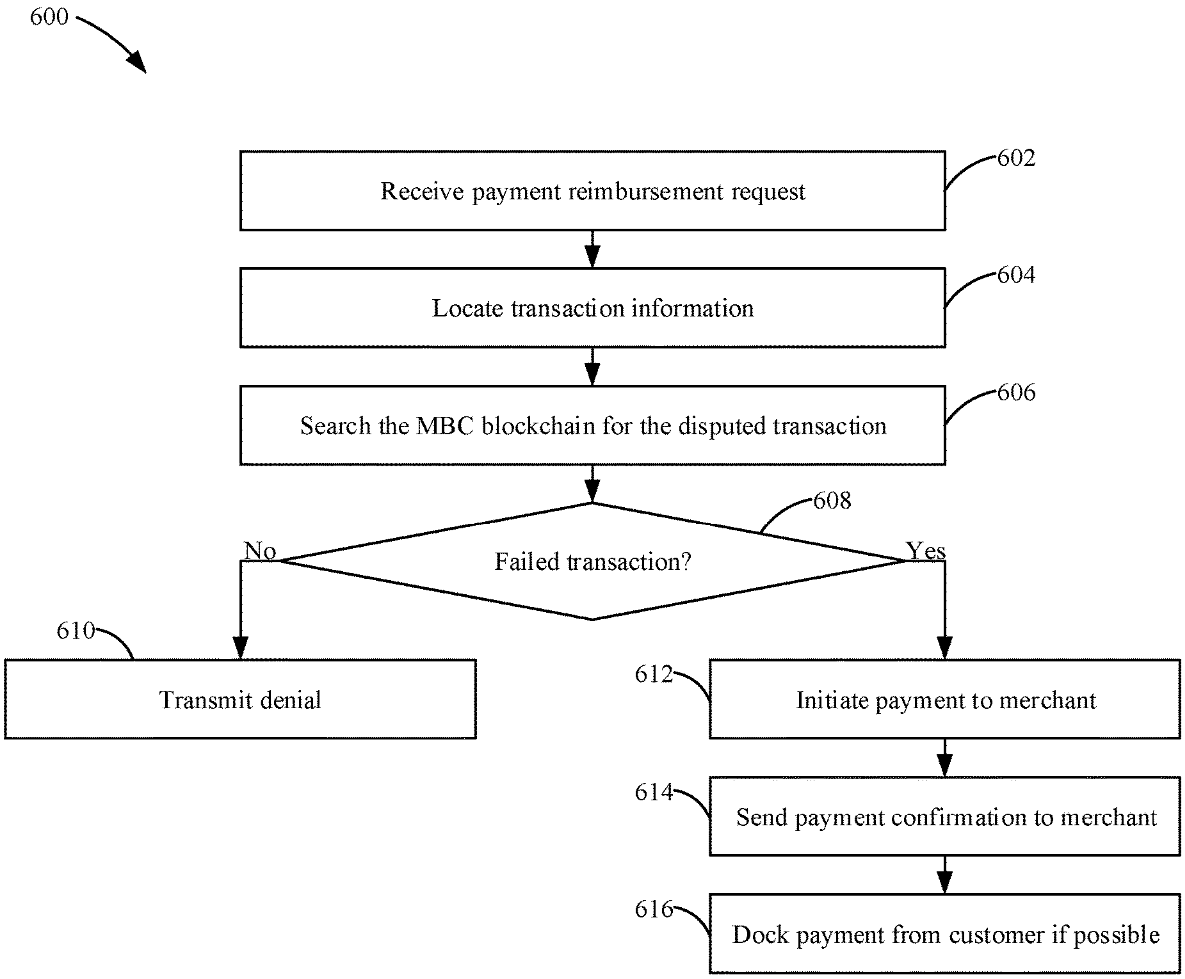
FIG. 6 is a flow diagram of a method 600 of paying out on a MBC transaction guarantee is shown according to an example embodiment.

Referring to FIG. 6, a flow diagram of a method 600 of paying out on a MBC transaction guarantee is shown according to an example embodiment. Method 600 is performed by the financial institution computing system 120

(e.g., by the processor 122). Method 600 is performed after the financial institution 118 issued a guarantee to a merchant for a pending MBC transfer from a customer to the merchant (e.g., as done in methods 400 and 500).

Method 600 begins when a payment reimbursement request is received at 602. The financial institution computing system 120 receives the payment reimbursement request from the merchant. The payment reimbursement request may be transmitted from a merchant computing system, such as the merchant POS terminal 110, or from an in-person dispute (e.g., a representative of the merchant calling a representative of the financial institution 118 who enters the request into the financial institution computing system 120). In arrangements where the request is received from the merchant POS terminal 110, the request includes the MID and TID associated with the merchant POS terminal 110. The reimbursement request relates to MBC transfer from the customer to the merchant in which the merchant indicates the transfer was not confirmed by the MBC nodes 112 (i.e., the merchant was not actually transferred the underlying amount of MBC involved in the guaranteed transaction). The reimbursement request includes the guarantee identifier (e.g., as created in method 400 or 500).

Transaction information is located at 604. Based on the received guarantee identifier, the financial institution computing system 120 locates transaction information associated with the disputed MBC transfer from the customer to the merchant. The financial institution computing system 120 locates the transaction information by cross-referencing the guarantee identifier against the reconciliation database. In some arrangements, the reconciliation database is part of the MBC database 130. The reconciliation database includes a listing that matches each guarantee identifier with transaction details. The transaction details include a customer identifier, sending MBC address, a receiving MBC address, an amount of the MBC being transferred from the sender to the receiver, and a date of the transaction. As discussed above, the reconciliation database is used by the financial institution 118 in situations in which the merchant attempts to collect on a guarantee issued by the financial institution 118, such as the situation described in method 600.

The MBC blockchain 116 is searched for the disputed transaction at 606. The financial institution computing system 120 searches for the disputed transaction by cross-referencing the MBC blockchain 116 for transactions from the sending MBC address to the receiving MBC address. In some situations, multiple transactions may match the two addresses. For example, the customer may be a repeat purchaser from the merchant. In such situations, the disputed transaction is identified based on other transaction details, such as the amount of MBC being transferred, the date of the transaction, and the like. In certain situations, the failed transaction will appear as a failed transaction. In other situations, a failed transaction will not be recorded in the MBC blockchain 116. Accordingly, the absence of a transaction may indicate the existence of the failed transaction.

The financial institution computing system 120 determines whether the guarantee identifier corresponds to a failed transaction at 608. Based upon the information isolated (or lack of information) from the MBC blockchain 116, the financial institution computing system 120 determines whether the guarantee identifier corresponds to a failed transaction. If the guarantee identifier does not correspond to a failed transaction (i.e., the guarantee identifier corresponds to a successful transaction), then a denial is transmitted at 610. The financial institution computing system 120 transmits the denial to the merchant (e.g., to the merchant POS terminal 110). In arrangements where the denial is transmitted to the merchant POS terminal 110, the message containing the denial is routed via the MID and TID associated with the merchant POS terminal 110. In some arrangements, the denial includes a pointer or record locator that directs the merchant to the portion of the MBC blockchain 116 that contains the successful transaction.

If the transaction failed, payment is initiated to the merchant at 612. The financial institution computing system 120 initiates payment to the merchant. In some situations, the payment is in the form of a MBC transfer from the financial institution 118 to the MBC address associated with the merchant. In other situations, the payment is in the form of a transfer of fiat currency from the financial institution 118 to the merchant. In such situations, the transfer is achieved by initiating an account clearing house payment, issuing a check, or by updating the account database 128 if the merchant is also a banking customer of the financial institution 118. The financial institution sends a payment confirmation to the merchant at 614.

If possible, payment from the customer is docked at 616. As discussed above with respect to methods 400 and 500, some guarantees relate to payments initiated by customers of the financial institution 118. If a customer of the financial institution 118 is the delinquent party associated with the failed transaction, the financial institution computing system 120 may dock payment from a customer account and update the account database 128 to reflect the docked payment.

The above-described systems and methods provide for expedited transactions where MBC is being exchanged between two parties. Although the verification of the transaction itself is not actually accelerated (i.e., the process performed by the MBC verification nodes 112), the described systems and methods allow for transactions to proceed as if they were verified in near real time. As such, these systems and methods facilitate improved MBC transactions between parties that result in significantly quicker transactions involving the transfer of MBC.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of providing a guarantee for a math based currency (MBC) transaction, the method comprising:

receiving, from a computing system, a request for a pending MBC transaction, the request comprising an MBC address of a first party, an MBC address of a second party, and an amount of MBC to be transferred from the MBC address of the first party to the MBC address of the second party;

determining a balance of MBC associated with the MBC address of the first party based on scanning an MBC blockchain ledger that maintains a verifiable public record of prior MBC transactions and balances associated with the MBC address of the first party;

in response to determining a threshold likelihood of success of confirming the pending MBC transaction directly based on the prior MBC transactions and balances maintained by the MBC blockchain ledger, generating and formatting a guarantee identifier;

embedding a copy of the guarantee identifier in a metadata field of the pending MBC transaction;

transmitting, to the computing system, the guarantee identifier; and transferring the amount of MBC from the MBC address of the first party to the MBC address of the second party, wherein verification of the pending MBC transaction via one or more MBC verification nodes is bypassed based on the transmission of the guarantee identifier to the computing system.

2. The method of claim 1, wherein transmitting the guarantee identifier to the second party includes routing the guarantee identifier to a point of sale (POS) terminal via a second party identification number and a terminal identification (TID) number.

3. The method of claim 1, further comprising:

transmitting, to an MBC wallet client on a first party device of the first party, the pending MBC transaction for broadcasting to the one or more MBC verification nodes.

4. The method of claim 3, further comprising:

transmitting, to the MBC wallet client, an alert indicating the one or more MBC verification nodes verified the pending MBC transaction, wherein the alert is presented via the MBC wallet client on the first party device.

5. The method of claim 1, further comprising:

determining the MBC address of the first party is associated with a financial institution; and comparing the MBC address with known addresses of the first party to identify account information of the MBC address of the first party.

6. The method of claim 1, further comprising:

determining the MBC address of the first party is not associated with a financial institution.

7. The method of claim 1, wherein determining the balance of MBC further comprises identifying all transactions associated with the MBC address of the first party.

8. The method of claim 1, wherein the metadata field is an op_return field, and wherein the transferred amount of MBC is cryptocurrency.

9. A system comprising:

at least one processing circuit configured to:

receive, from a computing system, a request for a pending MBC transaction, the request comprising an MBC address of a first party, an MBC address of a second party, and an amount of MBC to be transferred from the MBC address of the first party to the MBC address of the second party;

determine a balance of MBC associated with the MBC address of the first party based on scanning an MBC blockchain ledger that maintains a verifiable public record of prior MBC transactions and balances data associated with the MBC address of the first party;

in response to determining a threshold likelihood of success of confirming the pending MBC transaction directly based on the prior MBC transactions and balances maintained by the MBC blockchain ledger, generate and format a guarantee identifier;

embed a copy of the guarantee identifier in a metadata field of the pending MBC transaction;

transmit, to the computing system, the guarantee identifier; and transfer the amount of MBC from the MBC address of the first party to the MBC address of the second party, wherein verification of the pending MBC transaction via one or more MBC verification nodes is bypassed based on the transmission of the guarantee identifier to the computing system.

10. The system of claim 9, wherein transmitting the guarantee identifier to the second party includes routing the guarantee identifier to a point of sale (POS) terminal via a second party identification number and a terminal identification (TID) number.

11. The system of claim 9, wherein the at least one processing circuit further configured to:

transmit, to an MBC wallet client on a first party device of the first party, the pending MBC transaction for broadcasting to the one or more MBC verification nodes.

12. The system of claim 11, wherein the at least one processing circuit further configured to:

transmit, to the MBC wallet client, an alert indicating the one or more MBC verification nodes verified the pending MBC transaction, wherein the alert is presented via the MBC wallet client on the first party device.

13. The system of claim 9, wherein the at least one processing circuit further configured to:

determine the MBC address of the first party is associated with a financial institution; and compare the MBC address with known addresses of the first party to identify account information of the MBC address of the first party.

14. The system of claim 9, wherein the at least one processing circuit further configured to:

determine the MBC address of the first party is not associated with a financial institution.

15. The system of claim 9, wherein determining the balance of MBC further comprises identifying all transactions associated with the MBC address of the first party.

16. The system of claim 9, wherein the metadata field is an op_return field, and wherein the transferred amount of MBC is cryptocurrency.

17. One or more non-transitory computer-readable storage media having instructions stored thereon that, when executed by at least one processing circuit, cause the at least one processing circuit to:

receive, from a computing system, a request for a pending MBC transaction, the request comprising an MBC address of a first party, an MBC address of a second party, and an amount of MBC to be transferred from the MBC address of the first party to the MBC address of the second party;

determine a balance of MBC associated with the MBC address of the first party based on scanning an MBC blockchain ledger that maintains a verifiable public record of prior MBC transactions and balances associated with the MBC address of the first party;

in response to determining a threshold likelihood of success of confirming the pending MBC transaction directly based on the prior MBC transactions and balances maintained by the MBC blockchain ledger, generate and format a guarantee identifier;

embed a copy of the guarantee identifier in a metadata field of the pending MBC transaction;

transmit, to the computing system, the guarantee identifier; and transfer the amount of MBC from the MBC address of the first party to the MBC address of the second party, wherein verification of the pending MBC transaction via one or more MBC verification nodes is bypassed based on the transmission of the guarantee identifier to the computing system.

18. The one or more non-transitory computer-readable storage media of claim 17, having additional instructions stored thereon that, when executed by the at least one processing circuit, cause the at least one processing circuit to:

transmit, to an MBC wallet client on a first party device of the first party, the pending MBC transaction for broadcasting to the one or more MBC verification nodes; and transmit, to the MBC wallet client, an alert indicating the one or more MBC verification nodes verified the pending MBC transaction, wherein the alert is presented via the MBC wallet client on the first party device.

19. The one or more non-transitory computer-readable storage media of claim 17, having additional instructions stored thereon that, when executed by the at least one processing circuit, cause the at least one processing circuit to:

determine the MBC address of the first party is associated with a financial institution; and compare the MBC address with known addresses of the first party to identify account information of the MBC address of the first party.

20. The one or more non-transitory computer-readable storage media of claim 17, wherein transmitting the guarantee identifier to the second party includes routing the guarantee identifier to a point of sale (POS) terminal via a second party identification number and a terminal identification (TID) number.

* * * * *